United States Patent [19]

Mosser

[11] Patent Number: 4,606,967
[45] Date of Patent: Aug. 19, 1986

[54] SPHERICAL ALUMINUM PARTICLES IN COATINGS

[75] Inventor: Mark F. Mosser, Sellersville, Pa.

[73] Assignee: Sermatech International Inc., Limerick, Pa.

[21] Appl. No.: 742,284

[22] Filed: Jun. 7, 1985

Related U.S. Application Data

[62] Division of Ser. No. 543,281, Oct. 19, 1983, Pat. No. 4,537,632.

[51] Int. Cl.⁴ ............... B32B 5/16; B32B 15/02; B05D 7/14
[52] U.S. Cl. .................. 428/220; 428/328; 428/469; 428/472; 428/701
[58] Field of Search ........... 428/328, 701, 469, 472, 428/220; 106/14.12; 148/6.16

[56] References Cited

U.S. PATENT DOCUMENTS

| 3,248,249 | 4/1966 | Collins | 106/14.12 |
| 3,248,251 | 4/1966 | Allen | 106/14.12 |
| 3,395,027 | 7/1968 | Klotz | 106/14.12 |
| 3,443,977 | 5/1969 | Bennetch | 106/14.12 |
| 3,562,011 | 2/1971 | Hirst et al. | 148/6.16 |
| 3,671,331 | 6/1972 | Malkin et al. | 148/6.16 |
| 3,869,293 | 3/1975 | Brumbaugh | 428/328 |
| 3,967,984 | 7/1976 | Helwig et al. | 148/6.16 |
| 4,319,924 | 3/1982 | Collins, Jr. et al. | 106/14.12 |

Primary Examiner—George F. Lesmes
Assistant Examiner—S. A. Gibson
Attorney, Agent, or Firm—Weiser & Stapler

[57] ABSTRACT

Coating compositions, coatings, coated parts and methods of use of chromate/phosphate type compositions. The coating compositions are of a type which contains small spheroidal aluminum particles having a defined size. The coated materials of the invention having improved corrosion and erosion resistance and improved low profile.

13 Claims, 20 Drawing Figures

CONVENTIONAL AIR ATOMIZED ALUMINUM POWDER MANUFACTURED BY
REYNOLDS AT 1,000X; REPORTED TO HAVE AN AVERAGE PARTICLE
SIZE OF 4.5-9 MICRONS. THEY ARE ROUNDED AND OF IRREGULAR
SIZE AND SHAPES

THE POWDER OF FIG. 1 AT 3,000X

SPHEROIDAL ALUMINUM POWDER HAVING AN EQUIVALENT SPHEROIDAL
DIAMETER OF ABOUT 3.9 MICRONS AT 1,000X

THE POWDER OF FIG. 3 AT 3,000X

SPHERICAL ALUMINUM POWDER HAVING AN EQUIVALENT SPHEROIDAL
DIAMETER OF 3.2 MICRONS AT 3,000X

THE POWDERS OF FIG. 5 AT 10,000X 1,000X OF A CHROMATE/PHOSPHATE COATING CONTAINING THE
ALUMINUM POWDER SHOWN IN FIGS. 1 AND 2

THE COATING OF FIG. 7 AT 300X

THE COATING OF FIG. 7 AT 10,000X

THE COATING OF FIG. 7 AT 3,000X

AT 1,000X OF A CHROMATE/PHOSPHATE COATING WITH THE ALUMINUM
POWDER SHOWN IN FIGS. 3 AND 4

AT 300X OF THE COATING OF FIG. 11

AT 10,000X OF THE COATING OF FIG. 11

AT 3,000X OF THE COATING OF FIG. 11

AT 1,000X OF A CHROMATE/PHOSPHATE COATING WITH THE ALUMINUM
POWDER SHOWN IN FIGS. 5 AND 6

AT 300X OF THE COATING OF FIG. 15

AT 10,000X OF THE COATING OF FIG. 15

AT 3,000X OF THE COATING OF FIG. 15

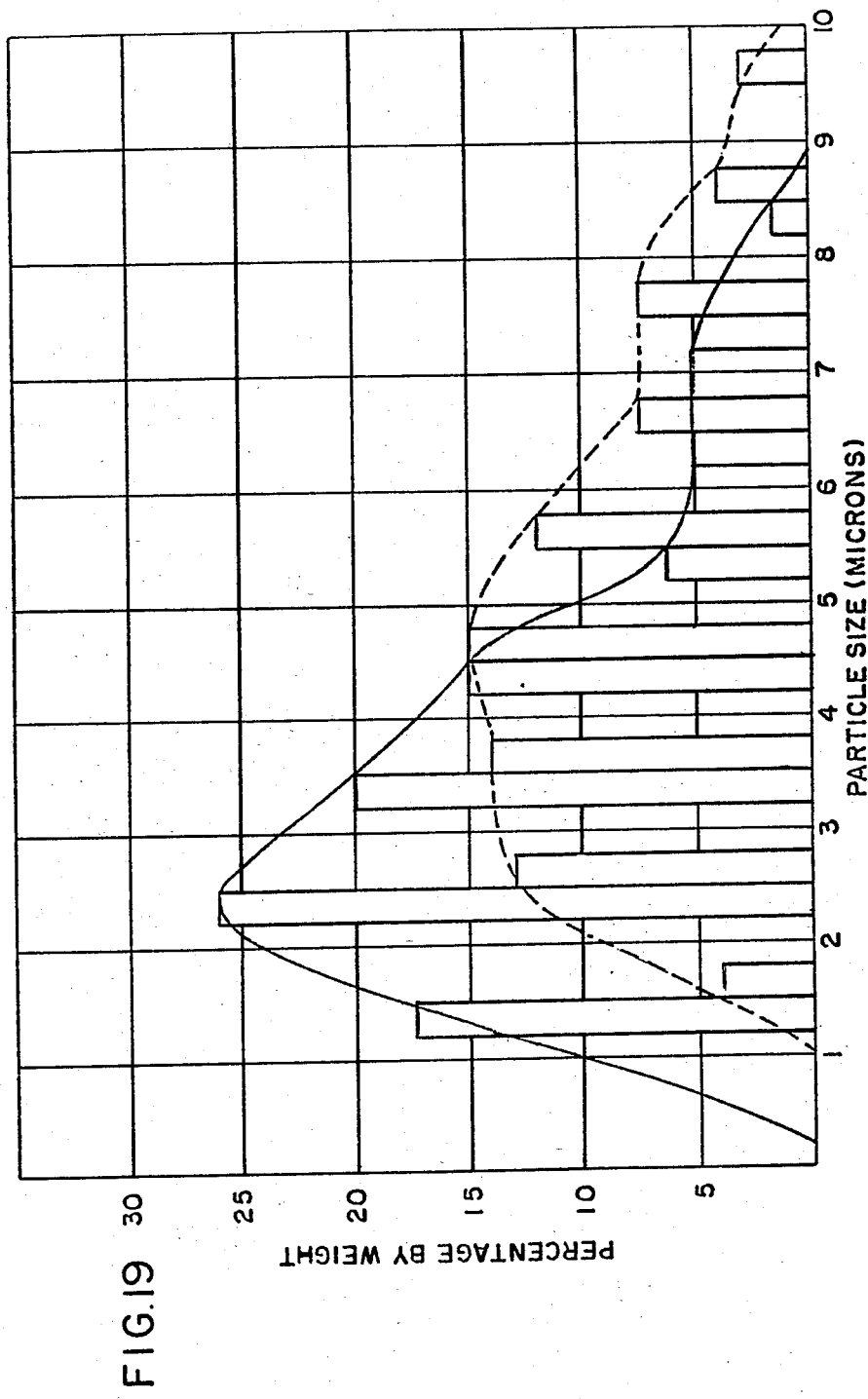
FIG.19 COMPARISON BETWEEN PARTICLE SIZE DISTRIBUTION OF REYNOLDS & A POWDER USED IN THE INVENTION

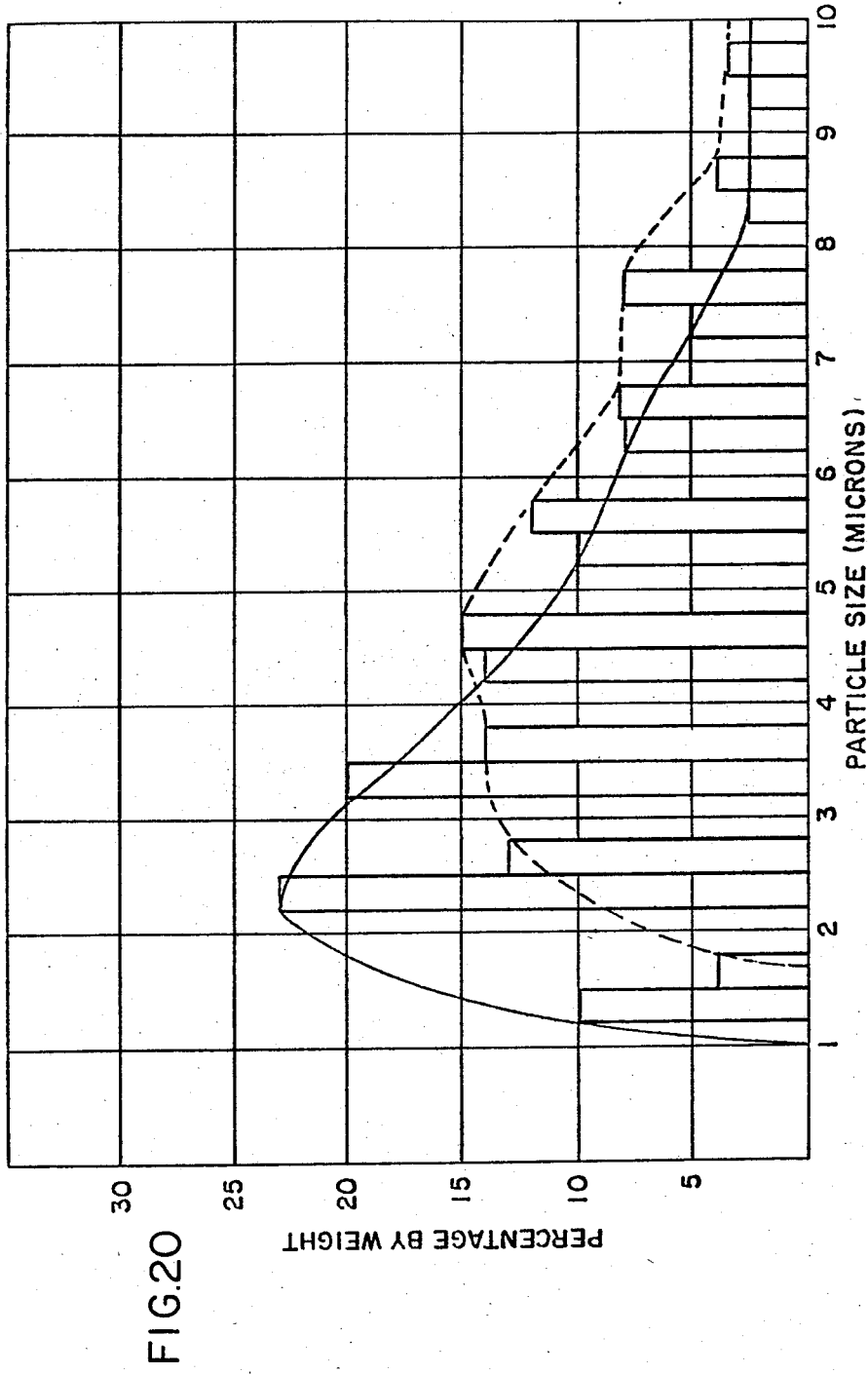

SPHERICAL ALUMINUM PARTICLES IN COATINGS

This application is a division, of application Ser. No. 543,281, filed Oct. 19, 1983 now U.S. Pat. No. 4,537,632.

This invention relates to an improvement in chromate/phosphate coating compositions which are particularly erosion, corrosion and abrasion-resistant. The coatings of the invention may be especially thin, have an especially low profile, i.e. be very smooth, and have high resistance to environmental conditions. They are especially well suited for various turbine engine compressor components including compressor disks, cases, spacers, shafts, blades, vanes, guide vanes, etc. In these applications coatings are exposed to extreme conditions and resistance to corrosion and erosion are mandatory. Coatings must also contribute to the compressor efficiency by having smooth surfaces.

More particularly, the present invention relates to chromate/phosphate coating compositions which contain spheroidal, atomized aluminum having a small average particle size and narrow size distribution.

The coating compositions and the coating of the invention are particularly well suited for parts of complex geometry, design or configurations where it is particularly important that the coatings be very smooth and thin (0.75 mils). These aspects are described further herein.

The coating compositions of the invention may be liquid (i.e. aqueous) or they may be dry in which case they are processed further (as discussed hereinafter) when they are applied to the substrate.

The coating compositions and coatings of the invention are also very well suited for dip/spin application, also further disclosed herein.

The virtually perfect spheroidal configuration of the metal powder constituent, combined with its small average size and narrow size distribution, produces coatings of unusually advantageous properties.

U.S. Pat. No. 3,248,251 ('251 Allen) describes coating compositions consisting essentially of a slurry of solid inorganic particulate material (especially aluminum) in an aqueous acidic solution containing substantial amounts of dissolved metal chromate, dischromate or molybdate, and phosphate. After application of a coating to the substrate, it is heated to a temperature upwards of about 500° F. until the coating is water insoluble.

U.S. Pat. No. 3,869,293 ('293 Brumbaugh) describes coating compositions similar to the composition of the '251 Allen patent which uses as the solid particulate material an alloy comprising aluminum and magnesium so as to further improve the corrosion resistance of the coating. The fine aluminum particles in these patents are of the conventional, air-atomized type, the smallest of these having an average particle size of about 5 microns.

These and similar patents have provided useful teaching to manufacture coated metals of improved oxidation and corrosion resistance and to metallize ceramics.

However, the requirements in certain industrial applications have and are expected to become increasingly stringent. There is an important and urgent need for thinner or smoother coatings capable of withstanding even more demanding and extreme conditions in numerous applications, such as in the aerospace industry as in turbine compressors for jet turbine engines.

There is also a need for coatings which can be applied by the dip/spin process thin enough to maintain closer tolerances on metal parts of intricate designs (such as screws, bolts, springs, etc.) and yet adequately protect these parts in corrosive and other harmful conditions.

It has been reported in the literature that aluminum powders and particles are manufactured in a variety of ranges, of sizes, and shapes. See *Aluminum*, Ed. K. Van Horn, American Society of Metals, 1967, vol. 1. Chapter 10, Properties of Powders and Powder Metallurgy Products, by J. P. Lyle, Jr. which is incorporated herein by reference.

The several types of powders and particles can be subdivided, according to the means of production. The important types of powders and particles have been characterized by Lyle, above cited, as follows:

1. Air-atomized powders are granular in shape with a cast structure. Individual particles may be as large as 1,700 microns or as small as 1 micron; commercial products do not necessarily contain particles over the entire range.
2. Spherical-Atomized powders are globular (approximately spheroidal) rather than spherical. They are atomized with non-oxidizing gases instead of air.
3. Water-Atomized powders are closer and more irregular in shape than air-atomized powders. The more irregular shape results in lower apparent and tapped densities.
4. Aluminum shot particles are generally globular in shape. They are made by centrifugal casting or by dropping from orifices.
5. Acicular particles are made by centrifugal casting under conditions that are different from those used for shot. They are caraway-seed shaped, which results in lower apparent densities than shot particles. These elongated particles are useful for chemical and metallurgical applications.
6. Grained aluminum is granular in shape. It is made by slowly stirring molten aluminum while it is solidifying.
7. Granulated aluminum is the coarsest commercial particle, and is characterized by a flattened globular shape.
8. Ultrafine powders are made by vaporizing and condensing aluminum in an inert atmosphere. The resulting spherical powder is colloidal in size, and has the highest specific surface of any aluminum powder.

In a totally different field of application, aluminum powders have been used in rocket fuels and propellants. They have been described to be constituted of a two phase system which normally consists of a solid inorganic oxidizer and a rubbery organic binder fuel. The inorganic oxidizer is most commonly ammonium perchlorate, the fuel is the aluminum powder and the binder commonly a polymer. The propellant typically includes about 60 to 85% ammonium perchlorate, between 1 and 20% aluminum powder and 10 to 20% binder. When the propellant is cured it has a consistency similar to a rubber eraser. The aluminum acts as the fuel. The aluminum powders are blends of particles of different sizes.

The polymer binders in such fuels are typically either thermo-plastic or thermosetting such as the acrylic, cellulosic, phenolic, polyester, polyethylene, polysulfide, polyurethane, polyvinyl chloride or synthetic rubber types. The propellants used for rockets are thus constituted of an organic polymer phase, an inorganic oxidizer and of the aluminum phase, which constitutes about 20 to weight precent of the mixture. For further details about the compositions of rocket propellants see the Alcoa Aluminum Powders in Rocket Propellants, section PAP 923 (FA2D-8), Powder and Pigments revised June 1982.

U.S. Pat. No. 3,248,251 (Allen) teaches that the aluminum powders incorporated into a chromate/phosphate binder should be less than 325 mesh (i.e. smaller than 44 microns). Grained and granulated aluminum as well as aluminum shot are too large to be used. Ultrafine powder is so fine as to be pyrophoric and should be avoided. Acicular and water-atomized powders are very irregularly shaped and pack poorly in thin films. Therefore, only air-atomized and spherical-atomized aluminum powders are contemplated to be used in chromate/phosphate coatings of the type described in the Allen patent.

Air-atomized grades of aluminum powder are produced by aspirating molten metal through a nozzle into a supersonic stream of air. The lower end of the nozzle dips into the bath of molten metal and its upper end terminates in a small orifice. When a jet of air is passed over the orifice of the nozzle it creates a suction effect, aspirating the liquid metal through the nozzle, into the airstream and disintegrating the molten stream into small, discrete particles.

When a stream of liquid is broken into individual droplets by a jet of gas, each droplet is initially flattened and elongated by the force of the gas stream. These droplets will rapidly return to a spherical shape in order to minimize surface area and surface energy. However, when aluminum is atomized in air, a hard, dense oxide film forms on the liquid drop before it can relax into a sphere. This oxide shell causes the particle to solidfy into the initial distorted shape of the droplet. Consequently, air-atomized aluminum powders, particularly the smaller grades, are irregular in shape.

The coatings and coating compositions of the invention which contain the metal, e.g. aluminum powders described are available commerically. They are reported to be manufactured by atomization by a process involving gravity-fed vertical atomization in a blanket of a non-oxidizing gas, or an inert gas, typically helium. While helium is generally used as the non-oxidizing gas phase other non-oxidizing gases such as nitrogen, argon, neon, krypton and others may be used.

In order to produce small, spherical aluminum powders, molten aluminum is aspirated into a jet of non-oxidizing or reducing gases, such as an exothermic gas, or an inert gas, such as helium. These protective atmospheres prevent oxidation on the surface of the droplet so that it can return into its equilibrium spheroidal shape. These grades of gas-atomized aluminum are known as "spherical" powders although they never actually achieve perfect sphericity because of the effect of gravity on the molten metal droplet.

Various grades of atomized powder are characterized by industry according to one of the following measured parameters: particle size or average particle diameter, particle size distribution, and particle shape or configuration. Particle size, the parameter most commonly used to distinguish grades of powder, is generally synonymous with particle diameter; however, particle diameter can only be determined accurately for spherical powders.

The average diameter of particles in any given powder grade is typically measured using the Fisher Sub Sieve Sizer (ASTM B330). This device measures the resistance to air flow through a packed column of powder relative to the resistance to flow through a packed bed of spherical particles of known average diameter. The advantage of this technique is that it is simple, fast and economical. However, because the process measures a bulk (column) property rather than monitoring individual particles, the average particle diameter determined by the Fisher Sub Sieve Sizer (FSSS) is actually a statistical average rather than a true particle size.

Since actual atomized powder particles rarely exhibit a perfect spherical shape (for reasons mentioned above), the particle size is most usefully established by measuring a characteristic property of an irregular particle that can be related to the same property of an ideal regularly shaped particle. By choosing a sphere as the ideal shape, the size of both air- and non-oxidizing gas-atomized powders can be reliably described as "equivalent to a sphere of diameter (d)," thereby combining the parameters of size and shape and incorporating variations in particle shape and size. An unequivocal, reproducible particle size having one dimension is thus established with this definition.

The equivalent spherical diameters (ESD) of aluminum particles in a particular grade of powder are measured by automated sedimentation equipment such as the Micromeritic SediGraph 5000 E particle size analyzer. This device uses low energy X-rays to determine the concentration of particles at various depths in a column of known fluid. The laws of hydrodynamics require that the settling rate of a particle in a fluid is related to the mass of the particle. The SediGraph determines the population of particles of a particular mass in the powder grade by measuring the density of particles at given levels within the fluid. Since the diameter of an ideal spherical particle is related to its mass by means of its density and volume (i.e. diameter), each density measurement in the SediGraph corresponds to a population count of particles with a mass that is equivalent to that of a spherical particle having a diameter, d (designated ESD). Therefore, grades of atomized powders are completely characterized by the population size distribution measured by the sedimentation technique and the average ESD ($\overline{ESD}$) corresponding to the median value in that distribution.

In accordance with this invention the powders which are used are both air- and non-oxidizing gas-atomized aluminum powders which will be described using equivalent spherical diameter (ESD) measurements provided by sedimentation equipment. Additional information regarding analytical test methods for characterizing aluminum powders is provided in the Alcoa pamphlet section PAP917 (FA2D-2) entitled "Quality Control and Analytical Test Methods for Alcoa Aluminum Powders." For additional information about automated sedimentation measurements, see the pamphlet "A Short Course in Fine Particle Technology" provided by Micromeritics Instrument Corporation.

The coatings of the invention described herein are mixtures of chromate/phosphate binders containing spheroidal (non-oxidizing gas-atomized) aluminum powders having an average equivalent spherical diameter ($\overline{ESD}$) less than about 4.0 microns. Such coatings are thinner than any made using air-atomized powder, and yet exhibit significantly better salt spray resistance and erosion resistance.

It was not expected that the particular metal powders used in the composition of the invention would bring about coatings having the combination of highly desirable properties described herein. Indeed, there were several reasons why one skilled in the art would not be likely to use such powders at all. First, their high reactivity and explosive nature causes one of average skill in this area to avoid using them. Moreover, in coatings it is known that small particles, especially in a narrower range of particle size distribution, tend to promote the physicochemical phenomenon of what is called "mud cracking", which causes the coating to blister and crack. This tends to occur during drying and curing and if not then, later upon exposure to heat and other corrosive elements. Therefore, it is commonly believed that a wider distribution of particle size contributes to a coating less likely to crack because there is a better distribution of physical stress in a mixture of particles having a greater proportion of particles of different sizes than in a mixture having a greater uniformity of particle sizes.

Furthermore, the improvement in performance realized by incorporating spherical powder less than 4.0 microns in diameter in chromate/phosphate binder as described herein, far exceeded that that would be expected from extrapolation of previous experience with fine grades of air-atomized aluminum. Particularly, the coatings of the invention achieve cure (binder insolubility) more rapidly and become electrically conductive at 1000° F. in less than one-half of the time required for conventional coatings. The coatings exhibit higher bond strengths as well as significantly better resistance to erosion by particle impingement, despite the fact that they contain the same amount of aluminum as do conventional coatings. Perhaps least expected was the fact that salt spray resistance of the cured, non-sacrificial coating of the invention far exceeded that of a cured air-atomized aluminum coating and was nearly equivalent to that of a sacrificial (conventional) aluminum-chromate/phosphate material.

Table I below shows particle size distributions of two commercially produced spherical aluminum powders (A and B) used in the invention and two of the smallest grades of commercially available air-atomized aluminum powders (C and D). Measurements of both ESD and average particle diameter (FSSS) are provided for comparison. The particle size distributions of powders A and B in reference to powder D are represented graphically in FIGS. 19 and 20.

TABLE I

PARTICLE SIZES AND DISTRIBUTION

| Powder | A | B | C | D |
|---|---|---|---|---|
| Less than 10 micron | 96% | 96% | 80% | 96% |
| 7 micron | 92% | 85% | 65% | 87% |
| 6 micron | 88% | 78% | 57% | 78% |
| 5 micron | 80% | 67% | 45% | 65% |
| 4 micron | 65% | 52% | 30% | 44% |
| 3 micron | 44% | 32% | 17% | 18% |
| 2 micron | 17% | 10% | 3% | 3% |
| Average ESD (micron) | 3.2 | 3.9 | 5.3 | 4.3 |
| Average particle diameter/Fisher Sub-Sieve Sizer (range) | 3.0–4.5 | 4.5–7.0 | 5.5 | 4.5–5.5 |

In accordance with the invention, generally, the lower limit of the particle size is that at which the particle is a non-pyrophoric powder in an oxidizing atmosphere. It is within the contemplation of the invention that powders be used which are passivated (non-pyrophoric) and/or powders which are transferred into the binder composition without exposure to air, as for example through an inert medium (liquid or gaseous), for instance in or through an inert gas like nitrogen, helium, argon and the like.

Thus, in accordance with the invention the aluminum powders used herein are those at least about 52, preferably 65 weight percent of the particles are not larger than about 4 microns. Another preferred group of powders are those wherein at least about 30 weight percent, preferably at least about 40 weight percent of the particles are not larger than about 3 microns. A more preferred class of aluminum powder is one wherein at least about 10 and preferably about 17.0 weight percent of the particles are not larger than about 2 microns. A highly preferred powder used has an $\overline{ESD}$ in the range of about 2.0 to about 4.0 microns.

A highly preferred powder is shown in Table I, labelled powder A. The average $\overline{ESD}$ is about 3.0. Another desirable powder used in the invention is labelled powder B in Table I.

In the more conventional metal powders, the average particle distribution size is such that not more than about 50 weight percent is smaller than 4 microns, and not more than about 20 weight percent is smaller than 3 microns. In such conventional powders, about at least 40 weight percent of the average particles are larger than 5 microns.

It will be noted that the Fisher Sub-Sieve Sizer average measurements do not adequately define the powders used herein inasmuch as their average Fisher Sub-Sieve measurements do overlap (at least partially) with those of the more conventional powders.

In accordance with the invention the term "aluminum" is intended to and does include aluminum alloys such as aluminum rare earth alloys, aluminum silicon alloys, aluminum lithium, aluminum copper base alloys like aluminum bronze, aluminum magnesium, aluminum zinc, aluminum manganese and others. The alloys can be binary or be or more than two metals other than aluminum. Aluminum alloys which can be used are thus alloys which have an electrode potential (calomel electrode) of at least −0.68 v. The alloys are preferably non-pyrophoric.

In accordance with the invention it is not necessary that all of the fine spherical metal particles ($\overline{EDS} < 4$ microns) be constituted of aluminum. The metal powders used in the coatings and the coating compositions of the invention may contain other metals such as nickel, cobalt, silicon, zinc, magnesium or other metals. The nature of the metal selected is dependent on the particular physical-chemical properties intended for the coating which do not detract from those improved by the invention. The particular properties contributed by any of these metals are known in the art.

In addition to the aluminum powder there may be included also ceramic powders, such as aluminum oxide, silicon dioxide, chromium oxide ($Cr_2O_3$).

Likewise, refractory compounds may be added to the aluminum powders, such compounds as nitrides, silicides, carbides, borides, such as boron carbide, silicon carbide, tungsten carbide, titanium boride, molybdenum disilicide, boron nitride, and others. The refractory compounds are added when it is desired to have coatings of increased hardness. The contribution to the physical-chemical properties of refractory compounds is known in the art.

Lubricants such as graphite or molybdenum disulfide may be used too.

The proportion of other compounds which may be mixed with the aluminum powder depends on the particular application intended for the coating but generally should not exceed that proportion which would detract from the principal benefits obtained in accordance with the invention. Generally, up to about 35% and preferably up to 25% of the total volume of any, that is one or more, of the compounds in powder form can be used based on total aluminum content. The additional compound need not have the spherical configuration, ESD, particle size distribution and other characteristics of the aluminum particles as described herein. However, the final particle blend should still display an average equivalent spherical diameter of 4.0 microns or less in order to optimize all of the advantageous properties provided by the use of and of the coatings of the invention.

Any of the above mentioned or other metals (including metal alloys) may be obtained in the particular spherical configuration, average particle size and/or average particle size distribution as described herein. When the metal powders used herein are so constituted by the other particles having also these characteristics, they further contribute to the desirable combination of the coating composition and coatings of the invention. The metal powders used in the invention have an $\overline{ESD}$ of 4.0 microns or less.

When it is not necessary to optimize all advantageous properties provided by the compositions and the coatings of the invention, these may contain aluminum powder mixtures which contain approximately up to 50 percent by weight of particle of an $\overline{ESD}$ below the figures given above, the balance being made up on metal particles, e.g. aluminum particles, which are of a larger size, so that the average $\overline{ESD}$ does not exceed 4.0 microns.

The differences between the mixture of aluminum particles used in the invention and other particles as well as chromate/phosphate coatings with such aluminum particles are shown in the SEM micrographs (identified as FIGS. 1–18, which are described below).

Figure 1:
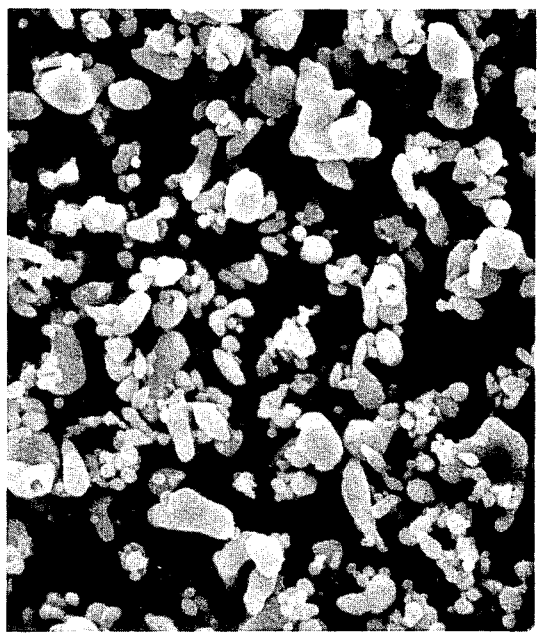
FIG. 1 is a photomicrograph of conventional air atomized aluminum powder manufactured by Reynolds at 1,000×; reported to have an average particle size of 4.5–6 microns, they are rounded and of irregular size and shapes.
Figure 2:
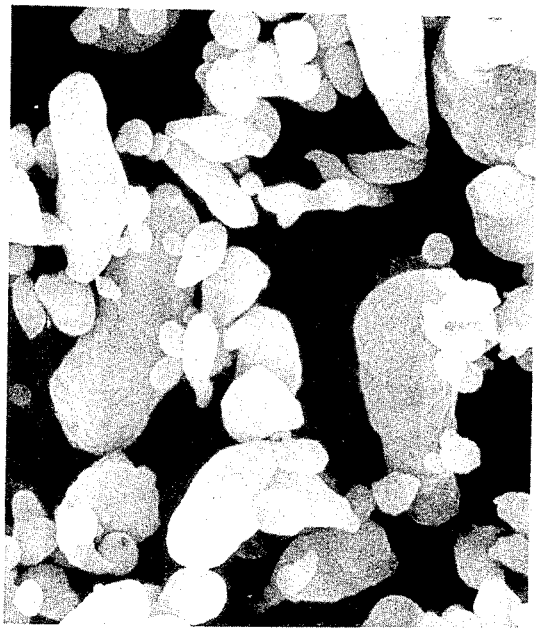
FIG. 2 is a photomicrograph of the powder of FIG. 1 at 3,000×.

The particles of FIGS. 3–6, in contrast to those of FIGS. 1–2, are virtually uniform and nearly spherical with an average Equivalent Spherical Diameter that is less than 4.0 microns.

Figure 7:

FIG. 7 is a photomicrograph of 1,000× of a chromate/phosphate coating containing the aluminum powder shown in FIGS. 1 and 2.

Figure 8:
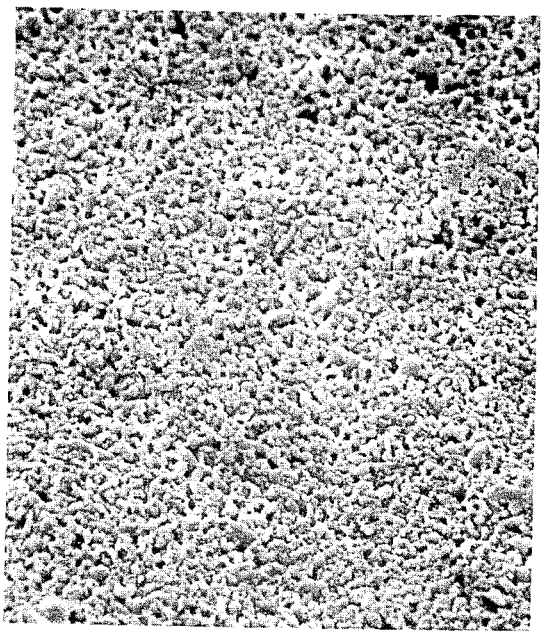

FIG. 8 is a photomicrograph of the coating of FIG. 7 at 300×.

Figure 9:

FIG. 9 is a photomicrograph of the coating of FIG. 7 at 10,000×.

Figure 10:
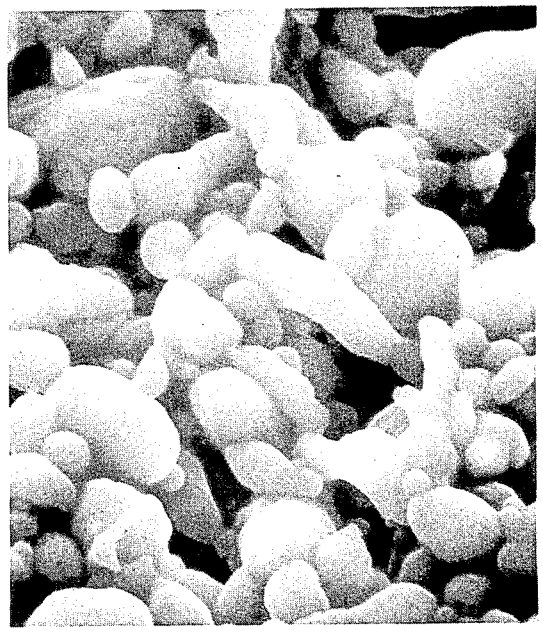

FIG. 10 is a photomicrograph of the coating of FIG. 7 at 3,000×.

Figure 3:
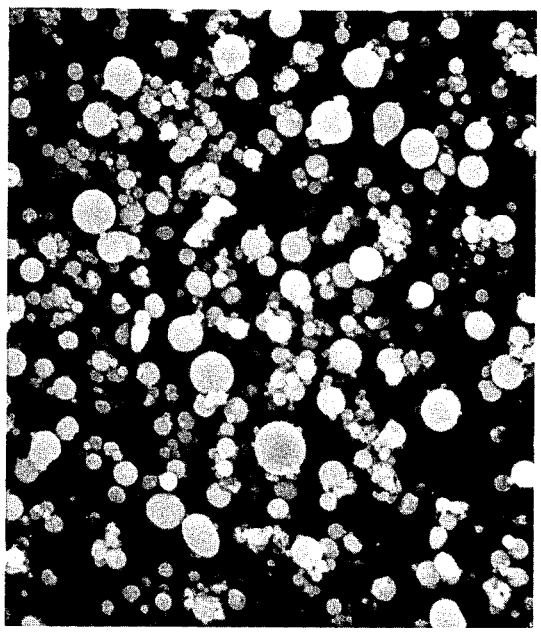
FIG. 3 is a photomicrograph of spherical aluminum powder having an average equivalent spherical diameter of about 3.9 microns at 1,000×.
Figure 4:
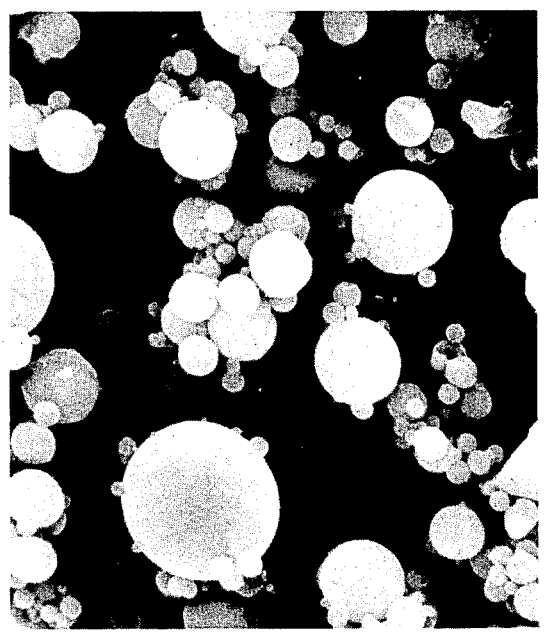
FIG. 4 is a photomicrograph of the powder of FIG. 3 at 3,000×.
Figure 11:
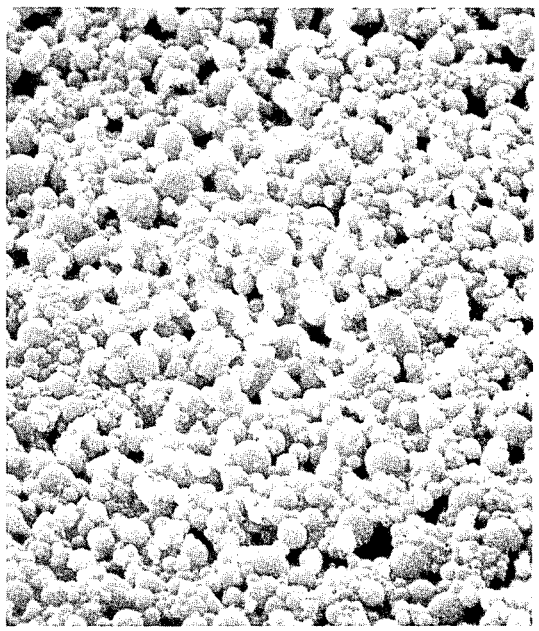

FIG. 11 is a photomicrograph at 1,000× of a chromate/phosphate coating with the aluminum powder shown in FIGS. 3 and 4.

Figure 12:
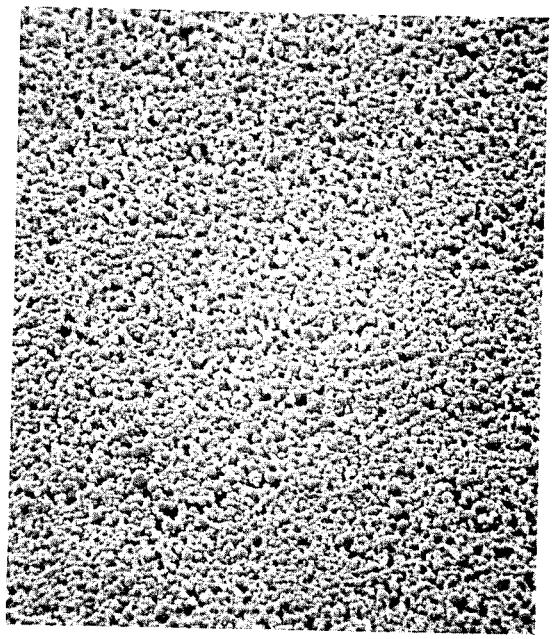

FIG. 12 is a photomicrograph at 300× of the coating of FIG. 11.

Figure 13:
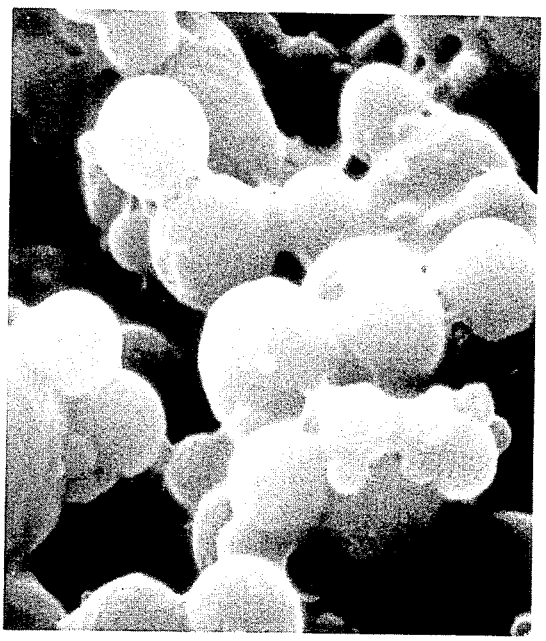

FIG. 13 is a photomicrograph at 10,000× of the coating of FIG. 11.

Figure 14:
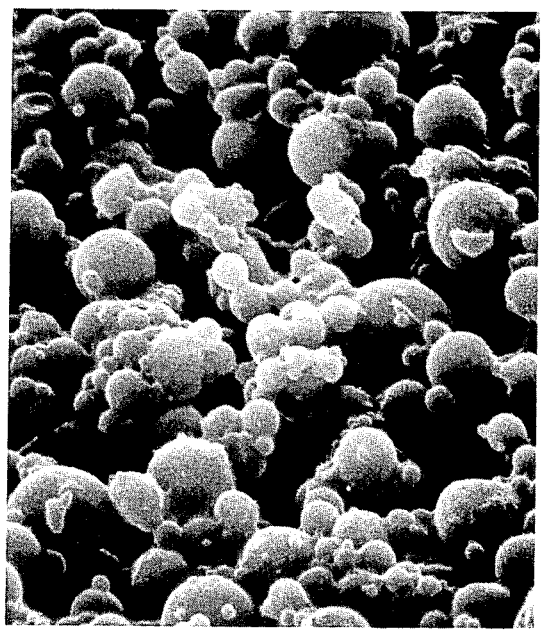

FIG. 14 is a photomicrograph at 3,000× of the coating of FIG. 11.

Figure 5:
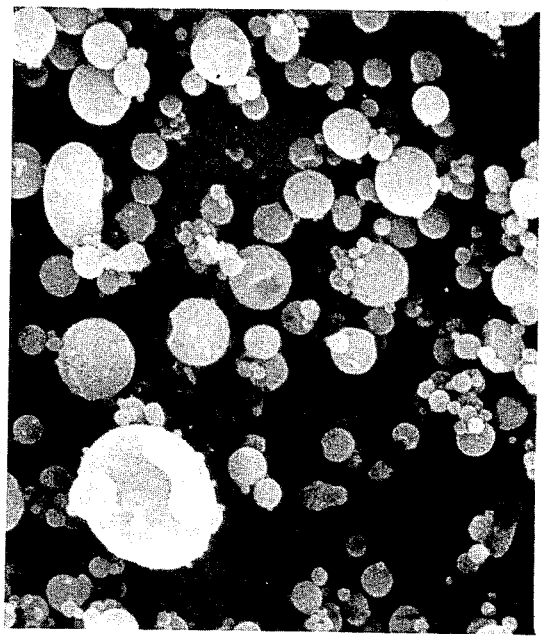
FIG. 5 is a photomicrograph of spherical aluminum powder having an average equivalent spherical diameter of 3.2 microns at 3,000×.
Figure 6:
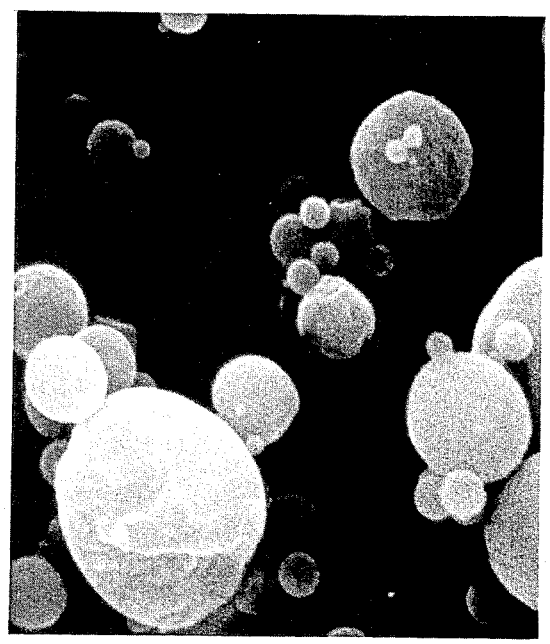
FIG. 6 is a photomicrograph of the powder of FIG. 5 at 10,000×.
Figure 15:
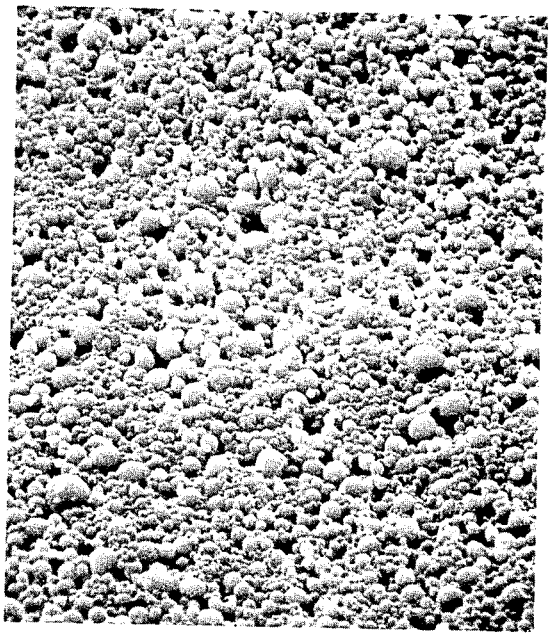

FIG. 15 is a photomicrograph at 1,000× of a chromate/phosphate coating with the aluminum powder shown in FIGS. 5 and 6.

Figure 16:
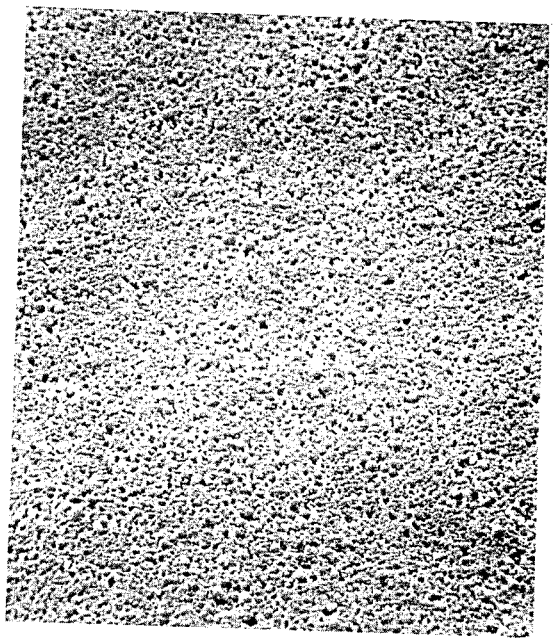

FIG. 16 is a photomicrograph at 300× of the coating of FIG. 15.

Figure 17:
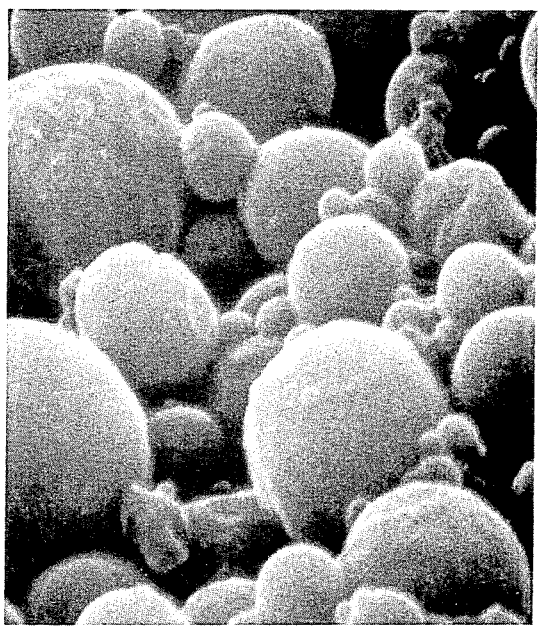

FIG. 17 is a photomicrograph at 10,000× of the coating of FIG. 15.

Figure 18:
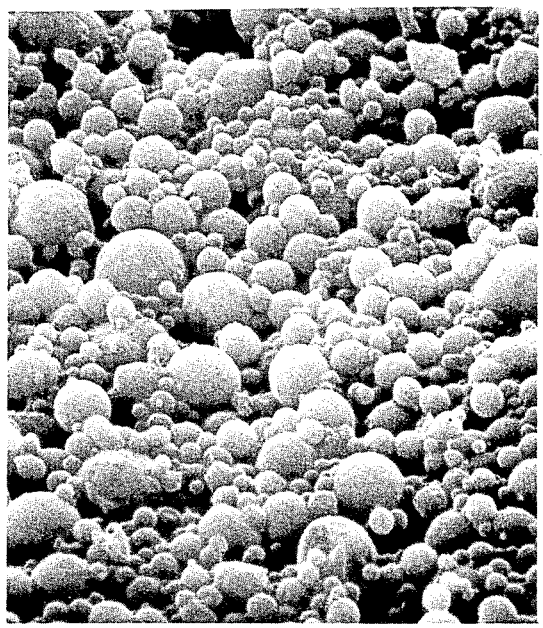

FIG. 18 is a photomicrograph at 3,000× of the coating of FIG. 15.

FIG. 19 and FIG. 20 show the particle size distribution curves of typical powders used herein, using sedimentation equipment with a side-by-side comparison with that of an air-atomized aluminum powder supplied by Reynolds Metals Company.

The coatings of the invention exhibit a combination of advantageous properties. Improvements in corrosion resistance, abrasion resistance, and smoothness of processed coatings have been observed which are superior to those obtained with conventional coatings.

The coating compositions and coatings of the invention are especially well suited, as described herein, for various gas turbine engine systems, like jet engines. The smoothness of the coating contributes to compressor efficiency. The coatings as described herein have improved erosion, corrosion and chemical corrosion resistance. They are especially well suited for such components as for compressors including the gas path surfaces of most turbine engine compressors, blades, vanes, shrouds, bearing supports, disks, shafts, cases, seals, spacers and other non-gas path components; hubs, exhaust ducts, burner cans, liners and transition ducts, etc. For such coatings, specifications generally call for a thickness not exceeding about 75 microns.

As described herein the coating compositions and coatings of the invention are particularly well suited for parts, e.g. metal parts of complex geometry and design used in common industrial applications like nuts, screws, fasteners, springs and in general for mating parts. In such parts, tolerance and hence thinness of the coatings is particularly critical, where minute differences in coating thickness are likely to adversely affect the pitch diameter of the part, e.g. to toothed wheel or both thread. For parts of complex geometry, configuration or design, in practice several applications (as by spray) have been attempted to reach the different angled surfaces but the resulting coating then becomes of objectionable thickness, such as over 25 microns. The coating compositions and coatings of the invention contribute significantly in overcoming these problems.

The typical requirements for turbine compressor coating applications are as follows:

1. Thickness—Coatings are generally less than 3 mils (75 μm) in thickness, on some components it is necessary that the coating is not thicker than 1 mil (25 μm); such components are compressor blades, vanes, disks, and spacers.

2. Profile—The coating surface roughness must be less than 63 microinches at 0.01 cutoff. The smoother the coating surface the better. It is highly desirable that the smoothness be 25 microinches or less.

3. The coatings must be erosion resistant when measured using the ASTM D968 Falling Sand Test. Abrasion coefficients must exceed 100 liters of sand per mil (0.001 inch) of coating.

4. Coatings must be sacrificial, i.e. scribed "X" specimens shall show no base metal rusting for at least 100 hours in the ASTM B117 Salt Spray Test. Normally, the coatings should resist 1,000 hours of such salt spray testing without base metal corrosion.

5. Coatings after curing shall show barrier corrosion resistance when tested in ASTM B117 Salt Spray Test. A 37.5 microinches thick coating will show light rusting after one week in ASTM B117 salt spray on alloy steel substrate.

6. Coatings must be capable of withstanding long term exposure to temperatures of up to 1000° F. (528° C.).

These highly exacting requirements are met and indeed exceeded by the compositions and coatings of the invention.

The coating compositions of the invention are also especially well suited for dip/spin coatings. Such coatings applied by the dip/spin method have improved corrosion resistance, improved uniformity of coating, thinner coatings, less additives are required to produce thixotropy because the pigments are more colloidal and unexpectedly the coatings cure more quickly at lower temperatures.

The coating compositions which include the aluminum particles described herein comprise a binder. Any binder known in the metallurgical coating art may be used. The compositions of the invention are constituted or made of aqueous solutions (or are solids as described hereinafter) of a combination of inorganic compounds from the group consisting of phosphoric acid, chromic acid, molybdic acid, and the metal salts of these acids. Preferred solutions contain phosphate anion and chromate (or dichromate) and/or molybdate anions. A great variety of such solutions are known for treatment of metal surfaces. For instance, Kirk and Othmer, Eds., *Encyclopedia of Chemical Technology*, 2nd ed., vol. 18, Interscience Publishers, a division of John Wiley & Sons, Inc., 1969 (pages 292–303), describes phosphate and chromate coatings. The United States patent literature describes coating solutions of dispersions for protective coating of metals, which compositions are suitable for use as components of the compositions of the invention. Such suitable compositions are disclosed by the Allen (U.S. Pat. No. 3,248,251); Brumbaugh (U.S. Pat. No. 3,869,293); Wydra (U.S. Pat. No. 3,857,717) patents referred to above, Collins (U.S. Pat. No. 3,248,249); Boies (U.S. Pat. No. 3,081,146); Romig (U.S. Pat. No. 2,245,609); Helwig (U.S. Pat. No. 3,967,984); Bennetch (U.S. Pat. No. 3,443,977); Hirst (U.S. Pat. No. 3,562,011) patents, and others. These disclosures are incorporated herein by reference. Other illustrative patents or literature showing corrosion inhibiting and protective coating compositions of phosphates, mixtures of phosphates and chromates and/or molybdates are known to one skilled in the art and further examples need not be supplied.

Since a critical component of the invention is the particulate metal, e.g. the aluminum spheroids as described herein, it will be appreciated that the particular nature of the acid liquid binder, (its ingredients and other variables), is of secondary importance allowing therefore a greater latitude in the selection (and proportions) of the other ingredients of the compositions for the coatings of the invention.

Other classes of binders may also be used. For instance, another class of suitable binders is silica-containing organic and inorganic liquids, especially water-soluble alkali silicates, like potassium and sodium silicate. Also included are those liquids which generate silicates, such as alkyl (e.g. ethyl) silicates. It is preferable that those having low rather than high alkalinity be used, e.g. those having a high $SiO_2/M_2O$ mole ratio. Other useful binders include synthetic organic binders such as silicones and phenolic resins and inorganic glasses such as borates and other frits.

Particulate materials, e.g. metals may be used with the aluminum powders described herein. Such materials are described in the literature, for instance in the cited (U.S. Pat. No. 3,248,251) Allen patennt, column 5, lines 8–41 and column 8, lines 8–44 which are incorporated herein by reference. In accordance with the invention, the $\overline{ESD}$ of the particulate material is less than or equal to 4 microns.

In the binder of the chromate/phosphate composition used it is not necessary that a metal ion be added. When the phosphate and/or chromate or molybdate ion is furnished to the solution by addition of a metal salt, as is often done, metal ion is inherently supplied to the solution. Hence, any of the known phosphates, chromates, dichromates or molybdates can be used as the source of metal ion. Additionally, as is know, metal ion can be supplied in a form such as metal oxide, hydroxide, carbonate, etc. which will dissolve in acid, i.e. phosphoric acid, chromic acid or molybdic acid, to produce the metal phosphate, chromate or molybdate, and therefore the metal ion, plus water and/or gas which is evolved. The following metal compounds will illustrate those which can be added to generate the metal ion within the solution, by an acid-base reaction, in accordance with the above: magnesium oxide; magnesium hydroxide; zinc oxide; zinc hydroxide; aluminum hydroxide; lithium oxide; lithium carbonate; and calcium hydroxide. Metal compounds which may be added to generate the metal ion in solution are various oxides, hydroxides or carbonates of magnesium, zinc, aluminum or others. Such procedures and sources for the metal ions are known and reference may be made to the cited '251 Allen patent, for instance, column 7, lines 26–57, which is incorporated herein by reference.

The pH of the aqueous binder used herein is preferably, but not necessarily, in the range of about 0 to about 3.0, preferably in the range of about 1.5 to about 2.5.

If it is desired to prepare coating compositions which are especially well-suited for dip/spin, or application by dipping, the compositions may, optionally, contain certain amorphous silicas and a non-ionic surfactant, which causes the composition to be thixotropic. Such suitable additives (and the resulting compositions) are described in copending application serial No. 441,754, filed Nov. 15, 1982, which is incorporated herein by reference. Likewise, the compositions of the invention may be made thixotropic by incorporation of certain aluminas as disclosed in copending application serial No. 485,748, filed Apr. 18, 1983, which is incorporated herein by reference.

The compositions of this invention may, therefore, incorporate an acid-stable, non-colloidal amorphous silica and a non-ionic surfactant. Preferred is fumed silica, silica gel and precipitated silica. The viscosity generally ranges from about 600 to 45,000 cp. The pH will generally range from about 0.5 to 3.0. Where the composition comprises a dispersible hydrated alumina having a boehmite type crystal lattice, the viscosity is generally in the range of about 800 to about 50,000 cp. The pH generally ranges from about 1.5 to about 3.0.

It is a noteworthy aspect that by virtue of the ingredients of the compositions of the invention, the compounds which cause thixotropy (in accordance with the two above-referred to patent applications) can be used in a smaller amount and still cause the necessary thixotropy. For instance, an amount of silica of 0.1 to 3 percent by weight based on total solids may be used. In conjunction therewith, an acid-stable non-ionic surfactant in an amount of 0.005 to 0.1 percent by weight based on total solids may be used. Likewise, when it is desired to use a fumed alumina, less than 0.25% by weight such as 0.1% by weight may be used. It is understood, however, that the parameters of the ingredients disclosed in the above-referred to patent applications are quite applicable herein, but that these ingredients are usable in smaller proportions (or in the lower ranges) disclosed therein by virtue of the effect of the particular metal, e.g. aluminum spheroidal particles used in accordance with this invention.

On the coatings of the invention (at any stage prior to and including after rendering the coating sacrificial), there may be applied one or more layers of a coating of the invention, or of a conventional coating. Such top-coatings are disclosed in the art. Such top-coatings can be one of the above-described binders (without the aluminum), may have surfactants or other modifiers of the surface tension, including a fluorocarbon surfactant, cellosolve acetate, fumed silica, hypophosphites or other additives.

Another embodiment of the invention provides non-aqueous, virtually dry compositions, generally, of a crumb- or powder-like physical appearance and nature. These compositions comprise the metal, e.g. aluminum, powders described herein and a binder, such as are described herein, which is substantially free of water. Such a binder material may be obtained for instance by removing the aqueous phase (as by spray-drying or other convenient methods from the aqueous binder) or making one without the aqueous phase and admixing the aluminum powder with the other solid materials. The dry mixture may be ball milled to the desired particle size, such as 5 microns. The aluminum powders may be admixed with any or all of the non-aqueous components and the aqueous component admixed (in part or all of it) thereafter. These compositions contain ideally all the necessary solids, i.e. powdery, components including the aluminum powders. The aluminum powder can also be admixed to the other components in part (or all of it) before use. The aqueous composition with all or part of the aluminum (or other metal) powder may be prepared, then the liquid portion (all or partly) removed (as by spray-drying) and this composition may be reconstituted (or brought to the desired consistency) when one is ready or in preparation for its application to the substrate. Thus, these steps admixing or removing a component can be performed in any sequence which is desirable or most economical to achieve the objective intended. Such non-aqueous compositions are particularly well suited for transporting or shipping from one location to or closer to that where the coating composition is intended to be applied, at which time the aqueous phase will be added. Also, concentrates of the liquid compositions of the invention can likewise be prepared.

When the blends of the aluminum powders used in the invention contain particles of different sizes, the different components of the blends may be mixed to the compositions contemplated by the invention at any time prior to use providing the blend of aluminum powder in the composition conforms to the parameters described herein.

Other variations to constitute the compositions of the invention are contemplated by the invention and can be made by one skilled in the art.

Although the principal interest is in the coating of metal parts, it is evident that non-metal parts such as ceramics, plastics and other substrates can be coated also. The metal part can be of any ferrous or non-ferrous metal (or alloys), aluminum, zinc, brass, metals which are commonly used in the areospace industry, and the like.

The following examples are illustrative of the invention and are not intended to be limiting. It is evident to one skilled in the art that the ingredients of the various compositions illustrated (e.g., their relative proportions and amounts), as well as other variables and parameters can be modified while being within the scope and contemplation of the invention.

Example 1

Utilizing example 7 of the Allen '251, two compositions were prepared as follows:

| | |
|---|---|
| A. $CrO_3$ | 92 grams |
| $H_3PO_4$ | 323 grams |
| MgO | 72 grams |
| $H_2O$ to 1000 cc | |
| Helium atomized aluminum powder (spherical, 3.3 micron average equivalent spherical diameter) (Valimet H-3) | 800 grams |
| B. $CrO_3$ | 92 grams |
| $H_3PO_4$ | 323 grams |
| MgO | 72 grams |
| $H_2O$ to 1000 cc | |
| Aluminum powder (5.5 micron average equivalent spherical diameter) | 800 grams |

Turbine compressor blades were blasted with clean 100 mesh aluminum oxide and the above compositions were applied by spraying. The coatings were allowed to dry grey, oven dried at 175° F. for 30 minutes, and then cured at 650° F. for 30 minutes. After cooling, a second coat was applied and the drying and curing steps were repeated.

The blades were salt spray tested as cured and burnished. The burnishing step requires impingement of glass beads (140–270 mesh, for example) or aluminum oxide (100 mesh, for example) to mechanically cold work the coating surface and make the coating electrically conductive and sacrificial. Scribing "X" exposes the base steel and evaluates sacrificial action.

| Property | Test Results Coating A | Coating B |
|---|---|---|
| 1. Surface profile | 10–20 microinches | 40–50 microinches |
| 2. Salt spray test, burnished and scribed, 100 hours | pass | pass |
| 3. Salt spray test, alloy steel, no scribe or burnish, 168 hours | very light scattered rust staining | medium rust staining on all surfaces |
| 4. Erosion resistance ASTM D968 | 500 liters/mil | 166 liters/mil |
| 5. Time at 1000° F. (538° C.) until electrically conductive | 35 minutes | 90 minutes |

The same compositions are prepared, then spray dried. When ready for use, water to the desired amount is added to reconstitute the composition.

EXAMPLE 2

A. A binder was prepared with the following ingredients:

| Magnesium oxide | 18.6 g |
|---|---|
| Chromic acid | 91.3 g |
| Phosphoric acid (85%) | 273.4 g |
| Magnesium carbonate | 57.9 g |
| Water | 644.0 g |

B. The following mixture was prepared:

| Binder of Part A | 384 ml |
|---|---|
| Aluminum powder (spherical, ESD 3.3 micron | 454 g |
| Hydrogen peroxide (35%) | 15 ml |
| Fumed silica (Cab-O-Sil M-5) | 7.89 g |
| Triton X-100 | 0.2 g |
| Final Viscosity | 3818 cps |

The same composition using 5 micron air-atomized aluminum powder will produce a final viscosity of 1826 cps.

The composition is ideally suited for application by dip/spinning to metal fasteners. After application, the coating is cured at 700° F. for 10 minutes and the application/cure steps are repeated. The cured film is considerably more uniform when compared to similar coating utilizing conventional aluminum powder.

EXAMPLE 3

A binder composition is prepared of the following ingredients:

| Magnesium oxide | 72.5 g |
|---|---|
| Chromic acid | 92.0 g |
| Phosphoric acid | 318 g |
| Water (deionized) | 805 g |

This binder composition is spray-dried and ball milled to a 5 micron maximum particle size.

There are then mixed 360 grams of the spray dried binder with 800 grams of aluminum powder, spherical, helium atomized of about 3.5 micron average size. The mixed powder was kept sealed. When ready for use they are mixed with stirring with 920 grams of water (distilled) to give the desired composition of the invention.

EXAMPLE 4

A coating composition was prepared by mixing the following ingredients:

| Magnesium oxide | 58.2 g |
|---|---|
| Chromic acid | 286.0 g |
| Phosphoric acid (85%) | 856.3 g |
| Magnesium carbonate | 180.8 g |

To 620 g of the mixture, 428 g of a premixed 10% boehmite dispersion was added by stirring. The dispersion was prepared as follows:

| Water | 447 g |
|---|---|
| Hypophosphorous acid (50%) | 3.6 g |
| Dispersible boehmite alumina | 45 g |

The composition had the following characteristics:

| pH before dispersion addition | 1.6 g |
|---|---|
| Viscosity before dispersion addition | 1,285 cp |
| pH after dispersion addition | 2.2 g |
| Viscosity after dispersion addition | 1,850 cp |

Steel parts, namely screws and fasteners, were coated with the composition using the dip/spin method. The coating was dried at 175° F. and then cured at 650° F. To make the coating electrically conductive, the cured parts were burnished in a blaster using aluminum oxide grit. The coated parts had excellent resistance to standard salt spray and corrosion tests.

EXAMPLE 5

A binder composition of the type disclosed by Allen '251 was prepared according to the following formula:

| Magnesium oxide | 72.5 g |
|---|---|
| Chromic acid | 92.0 g |
| Phosphoric acid (85%) | 318.0 g |
| Deionized water | 805.0 g |

To 1,280 grams of the above binder, 800 grams of aluminum powder, spherical, helium atomized, 3.3 micron ESD was added. The coating was mixed using a high shear mixer.

To 636 grams of the coating composition, 10 grams of fumed alumina was added by mechanical stirring. The viscosity increased from 824 cp to 2,146 cp. When 160 grams of alumina dispersion was added to the coating, the viscosity increase was from 2,146 cp to 11,425 cp. The composition of the alumina dispersion was water 350 grams, hypophosphorous acid (50%) 60 grams, and dispersible boehmite alumina 80 grams. Final viscosities of about 10,000 cp were obtained regardless of the mixing order of the aluminas, and represented a viscosity level far in excess of that which could be obtained by either alumina by itself.

The coating composition was used to coat various fasteners by the dip/spin method. The fasteners were placed in a dip/spin basket, dipped into a coating vat containing the composition, removed and spun, spinning off excess coating. The parts were removed from the basket, dried at 175° F., and cured at 650° F. A second coat was applied in the same manner. To make the coating electrically conductive, the cured parts were burnished in a blaster using aluminum oxide grit until the coating was electrically conductive. The coated parts were highly resistant to extreme weathering conditions.

EXAMPLE 6

A coating composition of the following ingredients is prepared. No cations were added.

| | |
|---|---|
| $H_2O$ | 400 g |
| $H_3PO_4$ (75%) | 80 g |
| $CrO_3$ | 30 g |
| Aluminum powder (spherical, 3.2 μm $\overline{ESD}$) | 200 g |

The composition was spray applied to an automotive engine exhaust manifold. The coating was cured by operating the engine for 15 minutes. The manifold showed no signs of rust or oxidation when examined 3 months after coating.

EXAMPLE 7

A coating composition of the type disclosed by Wydra '717 was prepared. No cations were added but phosphorous acid is used to react with some of the chromic acid producing trivalent chromium and phsophoric acid in situ.

| | |
|---|---|
| $H_2O$ (deionized) | 295 g |
| $H_3PO_4$ (85%) | 87 g |
| $H_3PO_3$ | 42 g |
| $CrO_3$ | 62 g |
| Aluminum powder (spherical, 3.4 μm $\overline{ESD}$) | 300 g |

EXAMPLE 8

The following binder composition was prepared:

| | |
|---|---|
| $CrO_3$ | 92 g |
| $H_3PO_4$ | 323 g |
| MgO | 72 g |
| $H_2O$ to 2000 cc | |

To the above, 1600 grams of spherical aluminum powder, 3.3μm average particle size was added. The coating, when applied to mild steel panels, cured at 600° F. for 15 minutes, and buffed with a brass brush, had excellent corrosion resistance. Alternatively, ZnO or $Al(OH)_3 \cdot XH_2O$ dried gel could be substituted for some or all of the MgO without changing the results.

A very satisfactory coating thickness varies from 0.3 mils per coat to 1.5 mils per coat. Typical coatings will be 0.3 to 3 mils thick. Such coatings are obtained in accordance with the invention.

Other variations and uses for the compositions of the inventions will readily become apparent to those skilled in the art.

I claim:

1. A coated metal or ceramic part which has improved surface profile, corrosion resistance, and erosion resistance, which metal or ceramic part has a cured coating which comprises:
   (a) a binder which comprises phosphate and an inorganic compound of the group consisting of chromate or molybate and the metal salts thereof, and distributed and bound firmly thereby atomized aluminum spheroids having an average particle size not larger than 4 microns.

2. The coated metal or ceramic part of claim 1 wherein the coating is electrically conductive.

3. The coated metal or ceramic part of claim 2 which is a component of a turbine engine compressor.

4. The coated metal or ceramic part of claim 1 which is a part dip/spin coated.

5. The coated metal or ceramic part of claim 1 which is a metal part of complex geometry and configuration.

6. The coated metal or ceramic part of claim 1 which has a coating thickness less than about 3 mils.

7. The coated metal or ceramic part of claim 1 which has a thickness less than about 2 mils.

8. The coated metal or ceramic part of claim 1 which has a coating surface roughness of less than 25 microinches.

9. The coated metal or ceramic part of claim 1 which has a coating possessing an abrasion coefficient greater than 400 liters per mil when tested in accordance with ASTM-D 968.

10. The coated metal part of claim 1 wherein said binder further comprises a refractory compound selected from the group consisting of carbide or a nitride of boron, silicon or titanium.

11. The coated metal part of claim 1 wherein said aluminum spheroids is selected from the group consisting of powders consisting of A and B, powder A and B having a particle size distribution, respectively, as follows:

| Powders | A | B |
|---|---|---|
| Less than 10 micron | 96% | 96% |
| Less than 7 micron | 92% | 85% |
| Less than 6 micron | 88% | 78% |
| Less than 5 micron | 80% | 67% |
| Less than 4 micron | 65% | 52% |
| Less than 3 micron | 44% | 32% |
| Less than 2 micron | 17% | 10% | and an average ESD of 3.2 and 3.9, respectively.

12. The coated metal part of claim 11 wherein the aluminum powder is powder A, with said particle size distribution and average ESD.

13. The coated metal part of claim 1 wherein said binder is a spray dried binder.

* * * * *